Patented June 23, 1953

2,643,273

UNITED STATES PATENT OFFICE 2,643,273

METHOD OF SECURING RUBBER ADHESION TO METAL AND COMPOSITION THEREFOR

Charles H. T. Wilkins, Port Vue, Pa., assignor to National Standard Company, a corporation of Michigan No Drawing. Application March 18, 1950,
Serial No. 150,561

2 Claims. (Cl. 260—765)

This invention relates to methods for securing metals, and particularly steel, to adhesive rubber compositions, and the products involved.

The problem of securing this adhesion of rubber coating compositions to metal, and particularly to the ferrous metals, has heretofore been solved by the use of thin layers of other metals between the base metal and the rubber. Such methods are comparatively expensive, and the intervening metals sometimes are not desirable.

The present invention provides means by which this adhesion may be secured to ferrous base metals without any preliminary metal coating operation. In its preferred form the invention involves a provision of a soluble cobalt salt at the interface between the coating composition and the metal, preferably in the presence of a small amount of an ionizing agent such as water. The cobalt may be provided in the rubber coating composition, on the metal, or as a separate element.

Copper salts may be substituted for the cobalt, although with less effect. Manganese and nickel salts sometimes provide a slight improvement, but are by no means so effective as cobalt salts.

Best results have been achieved through the use of water soluble cobalt salts in the presence of sufficient water to secure proper ionization. Too much water may produce vapor blow-holes in the rubber composition, while too little reduces the degree of adhesion.

In its preferred form both the ionizing agent and the cobalt salt are dispersed in the rubber composition, the ionizing agent serving to assist in the proper dispersion of the salt. For this reason the best results have been obtained by pre-dissolving the cobalt salt in the ionizing agent and then dispersing it in the rubber composition. The water and cobalt salt are mixed with the crude rubber in the mixer, and water is provided in substantial excess so that although a considerable quantity evaporates during mixing there is still enough present upon vulcanizing to meet the requirements of the process.

It is desirable that the ionizing agent chosen be retained during the initial step of vulcanization of the rubber since it appears to assist in the reaction with the cobalt salt which bonds the rubber to the metal.

To a certain extent the physical condition of the coating composition determines the amount of water loss by vaporization during processing, and the amount used should be sufficient to compensate for this loss.

As an example of my invention, a rubber mix can be prepared and used in the following manner:

Mix .35% by weight of cobalt as cobaltous sulfate heptahydrate, based on the weight of the rubber compound, and 20 milliliters of water for each 8.4 grams of cobaltous sulfate heptahydrate, as an aqueous solution into a rubber compound by a suitable mixing method. Then the mixture of cobaltous sulfate heptahydrate, rubber and water in the above proportions is vulcanized onto the surface of bare steel for 45 minutes at about 292° F.

The water, or other ionizing agent, present appears to have an important role in the binding reaction. The addition of small amounts of water or other ionizing agents ranging from 1.2 to 3.5 parts for each part of cobalt sulfate increases adhesion of cobalt-rubber to bare steel considerably over the use of a dry cobalt salt. Cobalt salt may be used in this process in amounts ranging from .20% to .50% by weight, based on the weight of the rubber adhesive composition.

Table I below shows the ingredients of several test mixes, and Table II shows the increased adhesion to bare steel via the use of water and an ionizing agent.

TABLE I

*Composition of several adhesion test mixes*

No. 0, rubber compound without cobalt salt addition.

No. 1, 0.35% cobalt added to a rubber compound as powered $CoSO_4.7H_2O$.

No. 2, 0.35% cobalt added to a rubber compound as an aqueous solution of $CoSO_4.7H_2O$. (10 parts distilled $H_2O$ to 8.4 parts $CoSO_4.7H_2O$)

No. 3, 0.35% cobalt added to a rubber compound as an aqueous solution of $CoSO_4.7H_2O$. (20 parts distilled $H_2O$ to 8.4 parts $CoSO_4.7H_2O$.)

No. 4, 0.35% cobalt added to a rubber compound as an aqueous solution of $CoSO_4.7H_2O$. (30 parts distilled $H_2O$ to 8.4 parts $CoSO_4.7H_2O$.)

TABLE II

*A summary of the adhesion results obtained from rubber compounds of Table I when bonded to bare steel*

| Test Elements | No. 0 | No. 1 | No. 2 | No. 3 | No. 4 |
|---|---|---|---|---|---|
| Vulc. Time (min.) | 45 | 45 | 45 | 45 | 45 |
| Adhesion (lb./in.): | | | | | |
| High | 18 | 30 | 54 | 72 | 71 |
| Low | 15 | 20 | 35 | 55 | 48 |
| Average | 16.2 | 25.8 | 49.3 | 65.5 | 62.8 |
| No. of Tests | 13 | 13 | 13 | 13 | 13 |

Instead of incorporating the salt in the rubber composition, the metal may be dipped into a solution of the salt to place a coating of the salt on the metal. The rubber compound may then be applied to the metal and vulcanized thereto. Cobalt chloride has been found particularly valuable in this procedure. Vulcanization is carried on as before.

If desired, a thin layer of a rubber composition including the cobalt salt may be applied to the metal surface. Another rubber composition may then be placed over the first and the entire series vulcanized, the first rubber layer being adherent to the metal, and the second rubber layer being adherent to the first.

As an example of the use of cobalt chloride, 13.7 parts of $CoCl_2.6H_2O$ were dissolved in approximately 8 parts of distilled water and added to 986.3 parts of compounded rubber tire stock.

The foregoing detailed description has been given for clearness of understanding only, and no unnecessary limitations should be understood therefrom, as modifications will be obvious to those skilled in the art.

I claim:

1. A rubber adhesive composition containing therein from .2 to .5% by weight of cobalt based on the weight of the rubber, the cobalt being in the form of a water soluble cobalt salt and being in aqueous solution with about 1.2 to 3.5 parts of water for each part of cobalt salt.

2. In the method of bonding rubber to a ferrous metal, the step of applying to the metal a rubber adhesive composition containing therein from .2 to .5 percent by weight of cobalt based on the weight of the rubber, the cobalt being in the form of a water-soluble salt and being in aqueous solution with about 1.2 to 3.5 parts of water for each part of cobalt salt.

CHARLES H. T. WILKINS.

References Cited in the file of this patent

UNITED STATES PATENTS

| Number | Name | Date |
|---|---|---|
| 1,883,973 | Kurtz | Oct. 25, 1932 |
| 1,919,718 | Gray | July 25, 1933 |
| 2,080,730 | McCortney | May 18, 1937 |
| 2,226,938 | McCarthy | Dec. 31, 1940 |
| 2,435,191 | Adler | Feb. 3, 1948 |

OTHER REFERENCES

"Archief voor de Rubbercultuur," vol. 13, 1929, article beginning in page 125, abstracted in Marchionna's "Latex and Rubber Derivatives," vol. II, Abstract No. 2840, New York, 1937.